United States Patent [19]

Martens et al.

[11] Patent Number: 5,038,029
[45] Date of Patent: Aug. 6, 1991

[54] OPTICAL SENSOR ARRANGEMENT INCLUDING POLARIZATION-ALTERING SENSOR

[75] Inventors: Gerhard Martens, Henstedt Ulzburg; Jürgen Kordts, Norderstedt, both of Fed. Rep. of Germany

[73] Assignee: U.S. Philips Corporation, New York, N.Y.

[21] Appl. No.: 398,040

[22] Filed: Aug. 24, 1989

[30] Foreign Application Priority Data

Aug. 27, 1988 [DE] Fed. Rep. of Germany ....... 3829103

[51] Int. Cl.$^5$ .............................................. G01N 9/04
[52] U.S. Cl. .................... 250/225; 250/231.19; 324/96
[58] Field of Search ............ 250/225, 227, 231 P, 250/231.10, 231.19, 227.17; 324/96, 262

[56] References Cited

U.S. PATENT DOCUMENTS

| | | | |
|---|---|---|---|
| 3,466,541 | 9/1969 | Bernard et al. | 324/96 |
| 3,679,974 | 7/1972 | Mollenbeck | 324/96 |
| 4,442,350 | 4/1984 | Rashleigh | 324/96 |
| 4,529,875 | 7/1985 | Brogardh et al. | 324/96 |
| 4,698,497 | 10/1987 | Miller et al. | 250/225 |
| 4,743,119 | 5/1988 | Ida | 250/231 P |

Primary Examiner—David C. Nelms
Assistant Examiner—Stephone Allen

[57] ABSTRACT

The invention relates to an optical sensor arrangement having a light emitting arrangement (2), which feeds a first emission light beam into a first emission optical waveguide (3) and a second emission light beam into a second emission optical waveguide, having a polarizer (5), which is coupled with the two emission optical waveguides and generates from the first and second emission light beam a respective linearly polarized light beam, and having an optical sensor (1), which alters the state of polarization of a supplied polarized light beam as a function of a physical quantity acting on the sensor and which supplies a sensor light beam formed from a polarized light beam. Behind the optical sensor (1) there is disposed an analyzer (7), which separates each sensor light beam into two linearly polarized reception light beams, one of which is fed to a light receiving arrangement (12) via a first reception optical waveguide (9) and the other via a second reception optical waveguide (11). From the reception light beams, the light receiving arrangement forms electrical signals, from which an evaluation circuit (13) determines the physical quantity.

6 Claims, 2 Drawing Sheets

OPTICAL SENSOR ARRANGEMENT INCLUDING POLARIZATION-ALTERING SENSOR

BACKGROUND OF THE INVENTION

1. Field of the Invention

The invention relates to an optical sensor arrangement having a light emitting arrangement for the feeding-in of a first emission light beam into a first emission optical waveguide and a second emission light beam into a second emission optical waveguide, having a polarizer, coupled with the two emission optical waveguides for the generation of a linearly polarized light beam from both the first and second emission light beam, and having an optical sensor for the alteration of the state of polarization of a supplied polarized light beam as a function of a physical quantity acting on the sensor and for the supply of a sensor light beam formed from a polarized light beam.

2. Description of the Related Art

An optical sensor arrangement of the type referred to above is known from FIG. 2 of EP-A-0,175,358. In this case, a first light source conducts a first emission light beam via a first coupler and a microlens into a first optical waveguide. At the other end of the optical waveguide, the emission light beam is irradiated via a second microlens into a polarization splitter. The polarization splitter generates from the emission light beam a linearly polarized light beam which is passed to an optical sensor. The polarized light beam alters its state of polarization as a function of a physical quantity acting on the sensor, e.g. by pressure or an electrical or magnetic field. Via a retardation plate with a retardation of $\frac{1}{8}$th of a wavelength, the light beam emitted by the sensor is radiated onto a mirror, which reflects this light beam. Via the retardation plate and the optical sensor, the reflected light beam is radiated onto the polarization splitter, which generates two linearly polarized light beams. The first linearly polarized light beam is passed via the first optical waveguide to the first coupler, which deflects the light beam and conducts it into a first photodetector. The second linearly polarized light beam is irradiated via a microlens into a second optical waveguide and passed via a further microlens to a second coupler, which radiates the light beam into a second photodetector.

In the known arrangement, a second emission light beam, which temporally follows the first emission light beam, is irradiated from a second light source into the second optical waveguide. After the light beam generated by the second light source has passed through the polarization splitter, the optical sensor and the delay plate, the light beam incident on the mirror is reflected. After the reflection, the polarization splitter splits up the reflected light beam into two linearly polarized light beams and irradiates a respective linearly polarized light beam into each one of the two optical waveguides. After passing through the couplers, the linearly polarized light beams are received by respective photodetectors. From the total of four light intensities—converted into electrical signals—of the light beams received by the two photodetectors, a measure for the physical quantity is computed in a computing circuit, which measure is independent of the attenuation of the optical waveguides.

In this known optical sensor arrangement, reflections occur at optical boundary surfaces (e.g. the boundary surfaces at the polarization dividers, the microlenses, the sensor element and possibly at the plug-in connections for the optical waveguides), which are superposed upon the light beams at the photodetectors (light receiving arrangement). On account of these reflections, the measurement result is falsified. Moreover, in addition, in order to separate reflected and transmitted light beams couplers must be used, in which an additional light loss occurs as a result of attenuation in the coupler and as a result of the light splitting of the coupler.

FIG. 3 of EP-A 0,175,358 furthermore discloses an optical sensor arrangement in which a semi-transparent mirror is used. In this case, there is connected at one end of a first optical waveguide a coupler which receives a light beam from a first light source and sends a light beam to a first photodetector. Between the other end of the first optical waveguide and the semi-transparent mirror there is disposed a polarization splitter, which generates a linearly polarized light beam, an optical sensor and a retardation plate. The mirror reflects a part of the light beam and transmits the other part. On the other side of the mirror there is connected a second optical waveguide, which leads to a second coupler with light source and photodetector. As in the arrangement according to FIG. 2, light beams are emitted with a time shift via the two optical waveguides. In this case also, reflections take place at optical boundary surfaces.

SUMMARY OF THE INVENTION

Accordingly the object of the invention is to provide an optical sensor arrangement in which no reflections pass to a light receiving arrangement.

DETAILED DESCRIPTION OF THE PREFERRED EMBODIMENT

In an optical sensor arrangement of the type mentioned in the introductory paragraph, this object is achieved in that behind the optical sensor there is disposed an analyzer for the separation of each sensor light beam into two linearly polarized reception light beams, a light receiving arrangement, to form electrical signals from the reception light beams to determine the physical quantity by an evaluation circuit and a first reception optical waveguide and a second reception optical waveguide, to feed the reception light beams to the light receiving arrangement.

In the optical sensor arrangement according to the invention, the linearly polarized light beam leaving the polarizer is converted by birefringence in the optical sensor, which birefringence is generated by the physical quantity, into a sensor light beam with a state of polarization which is altered in relation to the linearly polarized light beam and which is a function of the physical quantity. The sensor light beam is then split up by an analyzer into two linearly polarized reception light beams. One of the reception light beams is passed via a first reception optical waveguide, and the other reception light beam via a second reception optical waveguide, to a light receiving arrangement. From the two emission light beams generated by the light emitting arrangement there are formed four reception light beams, which are combined in the evaluation circuit downstream of the light receiving arrangement in such a manner that the physical quantity is determinable without the attenuation which has taken place as a result of the optical waveguides. No reflections which falsify the measurement pass to the light receiving arrangement. Furthermore, no coupler is present in the arrangement, so that also no additional losses occur.

It is possible to use as the optical sensor light-transmitting bodies in which a birefringence is induced by action of a variable to be measured. Such light-transmitting bodies can consist, for example, of special plastics, special crystals or glasses. Either a linear or circular birefringence can be induced in the optical sensor. An elliptically polarized light beam is generated from a linearly polarized light beam by the linear birefringence. In the case of the circular birefringence, the light beam remains linearly polarized; the vector of this linearly polarized light beam, on the other hand, rotates.

In a further development of the invention, it is provided that polarizer and analyzer are constructed as polarization splitter cubes. The light beams entering and leaving a polarization splitter cube are perpendicular to one another. The emission and reception optical waveguides are therefore disposed perpendicular to one another. If the measurement effect is based on an induced linear birefringence in the optical sensor, the two polarization splitter cubes must be disposed so that the transmission directions are set perpendicular or parallel to one another. For measurement effects on the basis of circular induced birefringence in the optical sensor, the polarization splitter cubes must be disposed so that their transmission directions are set so as to be displaced by 45° relative to one another. It is also possible to use as polarizer or analyzer other, more expensive polarization dividers, eg. Wollaston, Rochon or Calcite prisms or Glan polarizers or Foster beam splitters.

In optical sensors based on linear birefringence, it is provided that a retardation plate with a retardation between $\frac{1}{4}$ and $\frac{1}{8}$th of a wavelength is disposed between polarizer and analyzer. The retardation plate brings about a situation in which the linearly polarized polarization light beam emerging from the polarizer or the elliptically polarized sensor light beam emerging from the optical sensor receives a defined fixed additional change of polarization, in order to obtain a simplified evaluation of the received signals (operating point setting).

In order to be able to undertake a measurement evaluation, the evaluation circuit must be able to associate the reception light beams with the emission light beams unambiguously. Accordingly, it is provided that either the light emission arrangement feeds in the first and second emission light beam temporally alternatingly into the first and second emission optical waveguide respectively, or that the light emission arrangement amplitude-modulates the intensity of the first emission light beam with a first modulation signal with a first frequency and the intensity of the second emission light beam with a second modulation signal with a second frequency, and feeds in both of them at the same time into the first and second emission optical waveguide.

In the evaluation circuit, after conversion of the light beams into electrical signals, a measure for the physical quantity is determined from the electrical signals for the intensity of the reception light beams. In this case, the ratio of the products $I_{11}.I_{22}$ and $I_{21}.I_{12}$ is formed, $I_{11}$ being the intensity of the reception light beam irradiated into the first reception optical waveguide and derived from the first emission light beam, $I_{22}$ being the intensity of the reception light beam irradiated into the second reception optical waveguide and derived from the second emission light beam, $I_{21}$ being the intensity of the reception light beam irradiated into the second reception optical waveguide and derived from the first emission light beam, and $I_{12}$ being the intensity of the reception light beam irradiated into the first reception optical waveguide and derived from the second emission light beam. The measure for the physical quantity can therefore be determined, for example, by computation of the equation $Q=I_{11}.I_{22}/(I_{21}.I_{12})$.

By way of example an illustrative embodiment of the invention is explained in greater detail hereinbelow with reference to the drawing.

BRIEF DESCRIPTION OF THE DRAWINGS

The drawing shows an optical sensor arrangement having an optical sensor 1, by means of which, for example, a pressure, an electric or a magnetic field can be measured. In this case, a first emission light beam is radiated from a light emission arrangement 2 via an emission optical waveguide 3 to a lens 4, which generates from the divergent light beam of the emission light beam a parallel light beam. Downstream of the lens 4 there is disposed a polarizer 5, which is constructed as a polarization splitter cube and generates from the first emission light beam a first linearly polarized light beam. The first linearly polarized light beam emerging from the polarizer then passes through a retardation plate 6 with a retardation of $\frac{1}{4}$ of a wavelength, before the first polarizer light beam enters the optical sensor 1. In this case, the retardation plate 6 generates from the linearly polarized light beam a circularly polarized light beam.

The optical sensor 1, which consists, for example, of special plastic, induces a birefringence in the case of action of a physical quantity (eg. pressure loading), and thus generates from the circularly polarized polarizer light beam an elliptically polarized sensor light beam, which is irradiated into an analyzer 7. The analyzer 7, which consists of a polarization divider cube, generates from the elliptically polarized sensor light beam two linearly polarized reception light beams which are coupled in via a lens 8 into a first reception optical waveguide 9 and via a lens 10 into a second reception optical waveguide 11. In this case, in the analyzer 7 one of the linearly polarized components of the sensor light beam is deflected by 90° in relation to the non-deflected other linearly polarized component of the sensor light beam. The two reception light beams are passed via the reception optical waveguides 9 and 11 to light receiving arrangement 12, where these are converted into electrical signals and are fed to an evaluation circuit 13.

Figure 1:
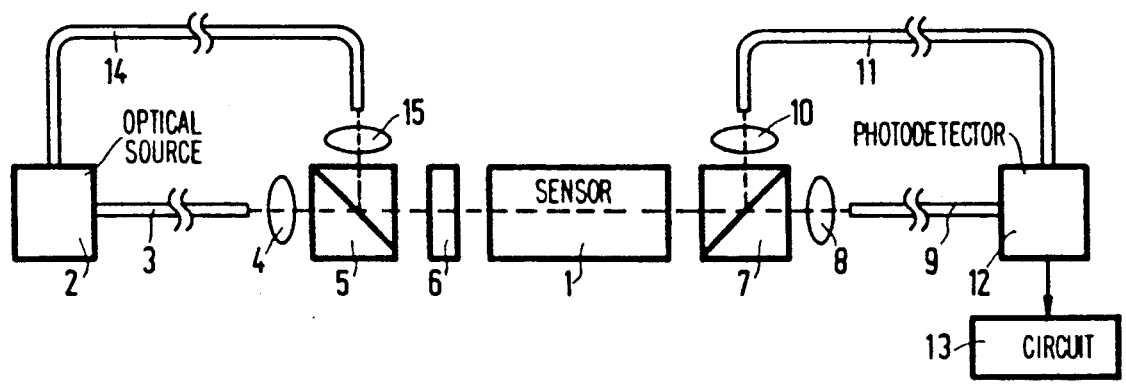
Figure 2:
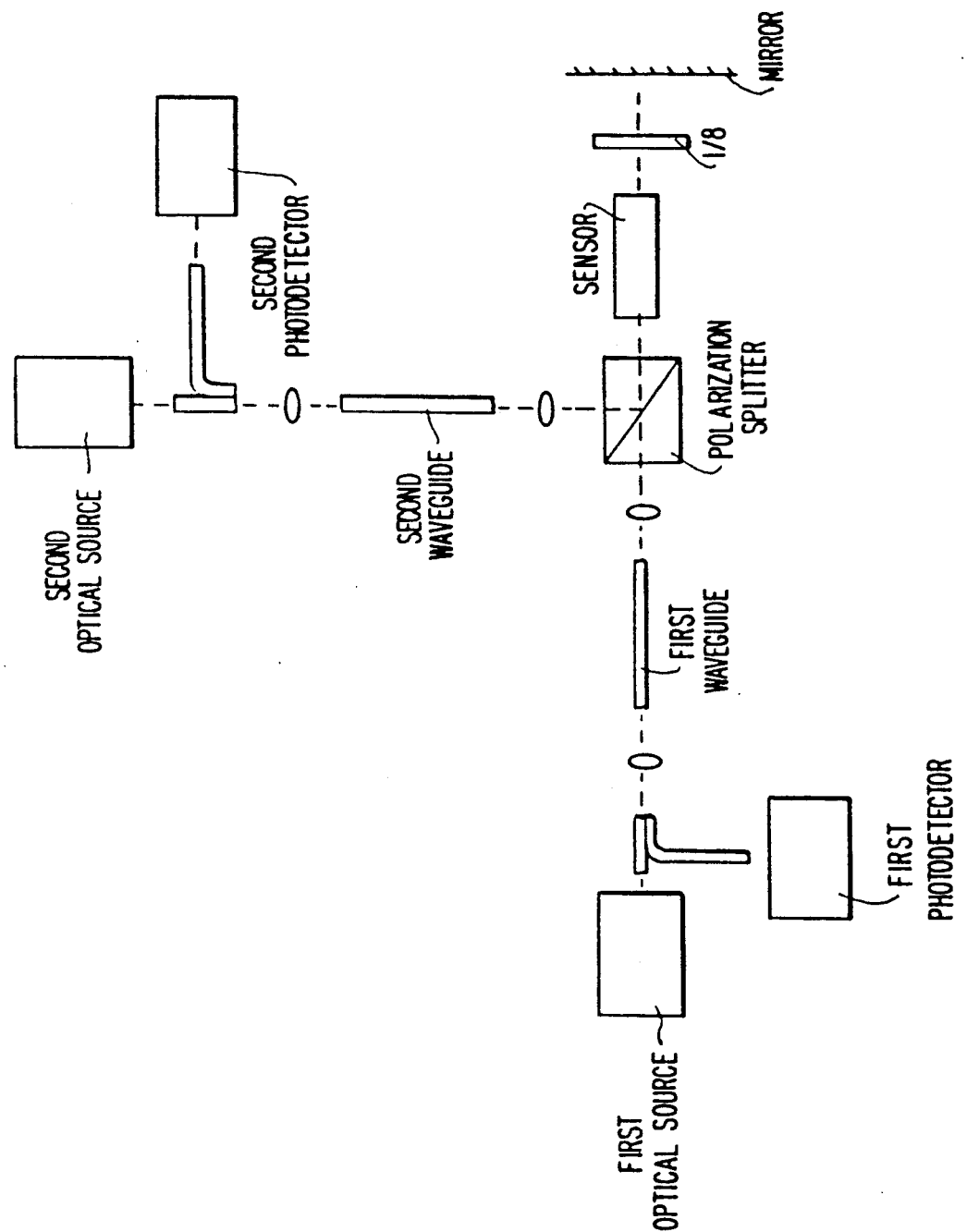

From the light emission arrangement 2, a second emission light beam is also passed via a second emission optical waveguide 14 to a lens 15. The lens 15 concentrates the emission light beam likewise before it enters the polarizer 5. In the polarizer 5, the emission light beam is deflected by 90° and linearly polarized, so that a second linearly polarized light beam is irradiated via the retardation plate 6 into the optical sensor 1. After passing through the retardation plate 6 and the optical sensor 1, a second sensor light beam is passed to the analyzer 7, which second sensor light beam is split up by the latter again into two linearly polarized reception light beams, which are coupled in into the two reception optical waveguides 9 and 11. The reception optical waveguides 9 and 11 likewise conduct to the light receiving arrangement the reception light beams, which originate from the second emission light beam and which are converted into electrical signals in the light receiving arrangement 12 and are passed to the evaluation circuit 13.

The light emission arrangement 2 can feed in the first and second emission light beam temporally alternatingly into the first and second emission optical waveguide respectively or can generate two emission light beams, the intensities of which are amplitude-modulated by two modulation signals with differing frequencies and couple in both of them simultaneously into the emission optical waveguides 3 and 14.

Since the second emission light beam is deflected by 90° in relation to the first emission light beam in the polarizer 5, the ends of the emission optical waveguides 3 and 14 are perpendicular to one another at their ends facing the lenses 4 and 15. Likewise, the ends of the reception optical waveguides 9 and 11 are perpendicular to one another. The polarizer 5 and the analyzer 7 can be oriented either in a parallel setting or in a crossed setting. An optical axis of the retardation plate 6 is either parallel or perpendicular to a principal axis of the optical sensor 1. The optical axis of the retardation plate 6 is rotated by 45° with respect to the direction of the polarization vector of the linearly polarized polarizer light beam.

In the evaluation circuit 13, a measure Q for the physical quantity to be determined is determined from the electrical signals. In this case, the electrical signals, which are proportional to the light intensity of the reception light beams, are determined from the following equation: $Q = I_{11} \cdot I_{22}/(I_{21} \cdot I_{12})$. $I_{11}$ is the intensity of the reception light beam irradiated into the first reception optical waveguide 9 and derived from the first emission light beam, $I_{22}$ is the intensity of the reception light beam irradiated into the second reception optical waveguide 11 and derived from the second emission light beam, $I_{21}$ is the intensity of the reception light beam irradiated into the second reception optical waveguide 11 and derived from the first emission light beam, and $I_{12}$ is the intensity of the reception light beam irradiated into the first reception optical waveguide 9 and derived from the second emission light beam. The measure Q for the physical quantity is independent of the attenuation losses in the two emission optical waveguides 3 and 14 and the two reception optical waveguides 9 and 11.

In practice, it has become evident that the optical sensor arrangement is insensitive to temperature changes and that no reflections pass to the light receiving arrangement 12, and thereby the optical sensor arrangement is also suitable for very precise measurements.

We claim:

1. Optical sensor arrangement having a light emission arrangement (2) for the feeding-in of a first emission light beam into a first emission optical waveguide (3) and a second emission light beam into a second emission optical waveguide (14), having a polarizer (5), coupled with the two emission optical waveguides for the generation of a linearly polarized light beam from both the first and second emission light beams, and having an optical sensor (1) for the alteration of the state of polarization of a supplied polarized light beam as a function of a physical quantity acting on the sensor and for the supply of a sensor light beam formed from a polarized light beam, characterized in that behind the optical sensor (1) there is disposed an analyzer (7) for the separation of each sensor light beam into two linearly polarized reception light beams, a light receiving arrangement (12), for the formation of electrical signals from the reception light beams to determine the physical quantity by an evaluation circuit (13) and a first reception optical waveguide (9) and a second reception optical waveguide (11), for feeding the reception light beams to the light receiving arrangement.

2. Optical sensor arrangement according to claim 1, characterized in that polarizer (5) and analyzer (7) are constructed as polarization splitter cubes.

3. Optical sensor arrangement according to claim 1, characterized in that a retardation plate (6) with a retardation between $\frac{1}{4}$ and $\frac{1}{8}$th of a wavelength is disposed between polarizer (5) and analyzer (7).

4. Optical sensor arrangement according to claim 1, characterized in that the light emission arrangement (2) is disposed for the temporally alternating feeding-in of the first and second emission light beam into the first and second emission optical waveguide (3, 14) respectively.

5. Optical sensor arrangement according to claim 1, characterized in that the light emission arrangement (2) is disposed for the amplitude modulation of the intensity of the first emission light beam with a first modulation signal with a first frequency and of the intensity of the second emission light beam with a second modulation signal with a second frequency, and for the simultaneous feeding-in of both of them into the first and second emission optical waveguides (3, 14).

6. Optical sensor arrangement according to claim 1, characterized in that the evaluation circuit (13) is disposed for the determination of the measure for the physical quantity from the electrical signals for the intensity of the reception light beams by formation of the ratio of the products $I_{11} \cdot I_{22}$ and $I_{21} \cdot I_{12}$, $I_{11}$ being the intensity of the reception light beam irradiated into the first reception optical waveguide (9) and derived from the first emission light beam, $I_{22}$ being the intensity of the reception light beam irradiated into the second reception optical waveguide (11) and derived from the second emission light beam, $I_{21}$ being the intensity of the reception light beam irradiated into the second reception optical waveguide (11) and derived from the first emission light beam, and $I_{12}$ being the intensity of the reception light beam irradiated into the first reception optical waveguide (9) and derived from the second emission light beam.

* * * * *